United States Patent [19]

Shilad et al.

[11] Patent Number: 4,488,577
[45] Date of Patent: Dec. 18, 1984

[54] FIRE RESISTANT HOSE

[75] Inventors: Isaac U. Shilad; Lawrence E. Bouscher, both of Manhattan, Kans.

[73] Assignee: Parker-Hannifin Corporation, Cleveland, Ohio

[21] Appl. No.: 430,056

[22] Filed: Sep. 30, 1982

[51] Int. Cl.³ ............................................. F16L 11/04
[52] U.S. Cl. .................... 138/127; 138/126; 138/149; 138/178
[58] Field of Search ............... 138/127, 126, 125, 124, 138/149, 137, 178

[56] References Cited

U.S. PATENT DOCUMENTS

| | | | |
|---|---|---|---|
| 159,546 | 2/1875 | Hanmore | 138/149 X |
| 2,690,769 | 10/1954 | Brown | 138/126 X |
| 2,939,488 | 6/1960 | Bacon | 138/126 |
| 3,287,315 | 11/1966 | Connor et al. | 138/137 X |
| 3,460,578 | 8/1969 | Schmid | 138/125 |
| 3,580,289 | 5/1971 | James, Jr. et al. | 138/127 X |
| 3,599,677 | 8/1971 | O'Brien | 138/122 |
| 3,828,112 | 8/1974 | Johansen et al. | 138/137 X |
| 4,080,999 | 3/1978 | Bulters et al. | 138/125 X |
| 4,137,949 | 2/1979 | Linko et al. | 138/125 |
| 4,159,361 | 6/1979 | Schupack | 138/149 X |
| 4,249,971 | 2/1981 | Yap et al. | 138/137 X |

FOREIGN PATENT DOCUMENTS 617025  1/1949  United Kingdom ............... 138/127

Primary Examiner—James E. Bryant, III
Attorney, Agent, or Firm—Joseph B. Balazs

[57] ABSTRACT

A flexible hose for conveying fluids under pressure and suited for high temperature environments wherein the hose includes an elastomeric core tube, a thermal barrier over the core tube, a single ply of wire reinforcement and a rubber cover. Preferably the thermal barrier is a nonwoven fiberglass strip, but it may as well be an asbestos impregnated rubber compound.

2 Claims, 4 Drawing Figures

FIRE RESISTANT HOSE

BACKGROUND OF THE INVENTION

This invention relates to flexible composite hydraulic hose and more particularly to a wire reinforced hydraulic hose that has a polymeric core tube, an elastomeric cover and a thermal barrier between the core tube and reinforcement which makes the hose particularly suited for high temperature environments.

Hydraulic hose and rigid conduit structures which have fire retardant or fire resistant properties are known in the art. Thus, for example, one form of hose structure comprises a rubber core tube and rubber cover with reinforcement therebetween consisting of a full inner braid of wire, a braided fiberglass sleeve and a loose wire braid. Such structure is relatively large and weighty, lacks a high degree of flexibility and is relatively costly.

Another approach to fire retardant structures is taught in U.S. Pat. No. 4,137,949 wherein carbon cloth inner layers are applied over a conduit and further covered with a glass fiber cloth. The carbon cloth is woven or knitted from carbon fiber and requires a binder to form a matrix for application to a core structure. For flexible cores it is indicated that this binder could be rubber. Two spiral outer layers of woven fiberglass tape are suggested in this structure to complete the composite barrier.

Other flexible hose structures which employ fiberglass reinforcement layers therein over rubber core tubes include U.S. Pat. Nos. 3,500,867 and 4,111,237. In the former, an open weave fiberglass braid is employed in both layers while in the latter, a full or closed weave is preferred.

SUMMARY OF THE INVENTION

The present invention is an improvement over prior art fire resistant structures and provides a flexible hydraulic hose structure having improved fire retardant characteristics in a compact composite structure. This is achieved primarily in the placement of the thermal barrier adjacent the core tube, combined with an overlying wire braid layer. Placement of the wire close to the fitting in this manner provides a better grip between the hose and fitting, providing greatly improved fitting retention. The compact hose size provides greater flexibility and results in weight and material savings.

A preferred embodiment of the invention comprises a rubber core tube, a thermal barrier consisting of a nonwoven fiberglass strip applied longitudinally of the core tube, a single ply of wire reinforcement, and a rubber cover. Another embodiment of the invention comprises a thermal barrier formed instead of an asbestos impregnated layer of rubber laid adjacent the rubber core tube, while the invention contemplates as well, the use of thermoplastic and other elastomeric materials for core tube and cover.

BRIEF DESCRIPTION OF THE DRAWING

FIG. 1a is an enlarged fragmentary sectional view of a portion of the hose of FIG. 1 showing a part of the core tube, fiberglass strip, reinforcement and cover;

DETAILED DESCRIPTION OF THE INVENTION

Figure 1:
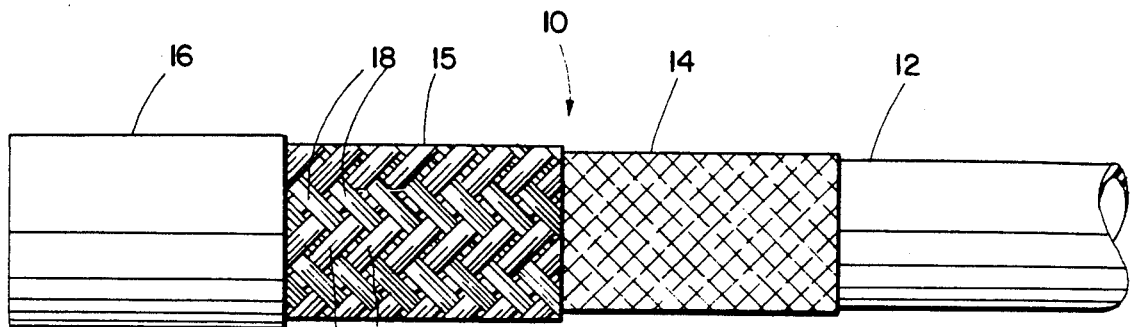
FIG. 1 is a side view, broken away in successive structural layers, of a hose made in accordance with the present invention and having fiberglass strip adjacent the core tube.

Referring now to the drawings, FIG. 1 illustrates a hose 10 having a core tube 12 of rubber material, a thermal barrier 14, a layer 15 of wire reinforcement material about the thermal barrier, and an outer cover 16 also of rubber material.

The hose 10 of this invention is particularly suited for formation by conventional vulcanization techniques and thus may be built up from a flexible mandrel or the like using conventional extrusion, braiding, winding and other known hose building techniques to form a composite structure which is eventually covered by a removable sheath for temporary encapsulation during the vulcanization process. Thus, in the preferred embodiments of this invention both the core tube 12 and cover 16 are rubber materials which are conventionally cured in well known vulcanization schemes. However, the teachings of this invention are applicable as well to other hose materials which might provide similar characteristics and thus the core tube and cover could be of thermoplastic elastomeric material or even a thermoplastic material and still achieve similar advantages. It will be apparent as well that many elastomeric materials such as Buna-N, nitrile, chlorinated polyethylene and the like may be employed for the core tube and cover of this hose product dependent upon the particular characteristics desired.

The key to the invention is the use of a thermal barrier such as 14 applied directly over the core tube 12 in combination with a layer 15 of wire reinforcement over the thermal barrier 14.

The wire reinforcement layer 15 is formed from any typical metal wire used in the hose industry such as carbon steel, copper, stainless steel, brass plated steel, or the like. The wire layer 15 is preferably applied as a braid shown in FIG. 1 in a two over, two under weave pattern, but it could as well be spirally wound or otherwise laid over the thermal barrier 14 in similar embodiments of the invention. Preferably, in all of these embodiments of the invention, the wire layer 15 is applied as a relatively open reinforcement structure comprising an open braid, for example, having a coverage on the order of 75%. The hose of this invention is applicable to relatively low or moderate pressure levels typically in the range of 500–1500 psi and therefore must be capable of withstanding burst pressures on the order of four times these pressure levels, and such pressure ranges are readily accommodated by known wire reinforcement configurations.

When the wire is applied as a braid to form the reinforcement layer 15, it is oriented at an angle of between 48° and 58° with respect to the longitudinal axis of the core tube. During the application of the wire to the tube, tension may be applied to the wire so that it firmly contacts the thermal barrier 14. An adhesive is not required to bond the wire to the thermal barrier 14 because the tension of the wire provides a sufficient mechanical lock therebetween. However for better integrity an adhesive can be applied at this interface, conveniently by application to the outer surface of the wire reinforcement layer 15, and through the spaces therein to the thermal barrier 14.

The thermal barrier 14 comprises a non-woven fiberglass cloth which is supplied in the configuration of an extended length or tape of material formed of the fiberglass fabric. This type of fiberglass cloth is known in the industry as Type E cloth and when applied to the core tube 12 provides a thermal barrier 14 which is on the order of 0.045" thickness in the radial dimension. The mesh or spacing of fiberglass in the cloth is relatively open and may comprise a single layer of cloth or may be made up of multiple layers and typically is applied on the thermal barrier 14 over the core tube 12 without adhesive material or softening agent. It is desired however, for most applications, to maintain the completed hose structure 10 quite flexible and thus it is advantageous to limit the number of layers of fiberglass cloth comprising the thermal barrier 14 and the wire reinforcement layer 15 to the minimum to achieve sufficient fire retardant properties in accordance with adequate burst strength. Type E fiberglass material suited for the teachings of this invention is made by Crane Co. Inc., Non-Woven Products Division, Dalton, Me. 01226.

In construction of the wire reinforcement layer 15, the preferred lay pattern is a two over, two under configuration. As depicted in the drawings each wire bundle 18, which typically comprises multiple strands of wire, is spirally wound over the thermal barrier 14, crossing over two similar wire bundles 19 wound in the opposite direction, then under two such oppositely wound wire bundles 18, to provide a braided structure. Preferably an open weave on the order of 75% coverage is desired, however lower percentages can be used, while a range of from 75–100% may provide a useful range of increased burst strength. A tension of from about 4 to 30 lbs. is applied to the wire bundles 18, 19 as they are applied to the structure. This, then is a mechanical lock between these adjacent layers, but is suitable in providing a composite hose structure having effective fitting grip retention characteristics. Not only does the wire reinforcement layer 15 provide the essential burst strength characteristic for the hose structure 10, but it is also effective in combination with the thermal barrier 14 in fire resistance, in being noncombustible and an efficient thermal conductor. Thus the wire reinforcement layer 15 is significant in providing strength, kink resistance, and resistance to burn through and/or cut through, while retaining good hose flexibility and fitting retention characteristics for the hose 10.

The outer cover 16 of the hose is comprised of a pressure extruded jacket of an elastomer such as chlorinated polyethylene (CPE). As the cover 16 is extruded onto the wire reinforcement layer 15, it is pressed into the interstices in the reinforcement layer 15 and achieves a mechanical interlock with the wire. Whether the cover 16 is a thermoplastic elastomer, pressure extruded in place, or a conventional thermoset rubber material, cured in place under vulcanization, a similar mechanical interlock is achieved, obviating the need for an adhesive or a special layer between the cover 16 an wire reinforcement layer 15. This mechanical interlock assists as well in maintaining the bundles 18, 19 of the wire layer 15 in position even though slight movement may occur during flexing of the hose or under pressure pulsation conditions. Such interlock minimizes abrasion at the wire/cover interface and is significant in providing a good fitting retention characteristic for the hose 10. The cover 16 of hose 10, in being pressed into the interstices in the reinforcement layer 15, contacts as well the thermal barrier 14 and becomes bonded to the thermal barrier upon subsequent vulcanization of the hose structure. The bond in this instance is primarily mechanical in that the fiberglass cloth forming thermal barrier 14 is of relatively open mesh and is readily penetrated by the elastomeric material of cover 16 either when initially applied or during vulcanization of the hose structure when the cover material is in a softened state. Upon completion of vulcanization, cover 16 attains a firmer final condition and a bond with the thermal barrier 14.

Figure 2:
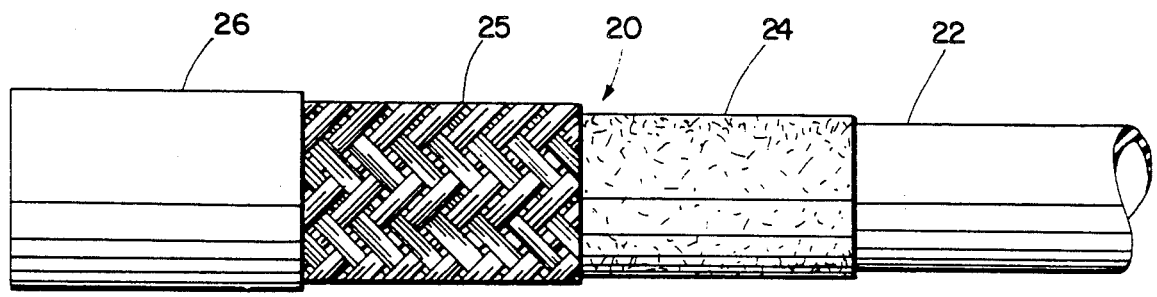
FIG. 2 is a side view, broken away in successive structural layers, of a hose made in accordance with the present invention and having a layer of asbestos impregnated rubber adjacent the core tube.

Another embodiment of hose 20 according to this invention is shown in FIG. 2 comprising a similar core tube 22 of rubber or elastomeric material, a thermal barrier 24 laid over the core tube 22, a similar wire reinforcement layer 25 as that described with reference to FIG. 1, and a cover 26 of rubber or similar elastomeric material. In this embodiment of the invention, the thermal barrier 24 is an asbestos impregnated rubber material rather than the fiberglass cloth forming the thermal barrier 14 of the FIG. 1 embodiment.

The asbestos-rubber thermal barrier 24 combines the fire resistant characteristic of asbestos in a binder or matrix of rubber that is readily applied to the core tube 22 by conventional extrusion techniques. The thickness of the thermal barrier 24 in this embodiment is somewhat greater than that specified for the fiberglass thermal barrier 14, but is dependent upon the percentage mix of asbestos with the rubber carrier. Not only is ease of application of thermal barrier 24 achieved by use of asbestos loaded rubber by extrusion techniques, but also a superior grip between thermal barrier 24 and core tube 22 and thermal barrier 24 and wire reinforcement layer 25. The former is attained primarily by bondment between compatible materials while the grip between thermal barrier 24 and wire layer 25 is primarily mechanical and due to better embedment of the wire in the thermal barrier 24.

Figure 3:
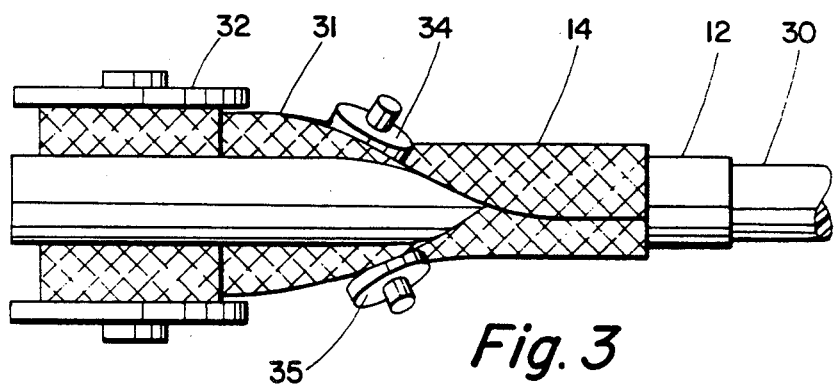
FIG. 3 is a side view of the hose of FIG. 1 in partially completed form, showing one method of laying the thermal barrier in a strip longitudinally of the axis of the hose.
Figure 4:
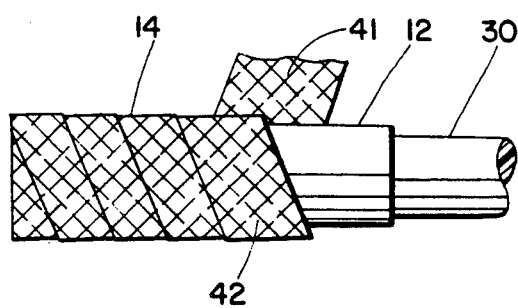
FIG. 4 is a side view of the hose of FIG. 1 in partially completed form, showing another method of laying the thermal barrier in a spiral overlapped strip.

FIGS. 3 and 4 relates to the hose construction 10 depicted in FIG. 1 and describe in more detail how the thermal barrier 14 is preferably applied. In these views similar reference numerals are used to refer to similar parts. Thus in FIG. 3 the partially constructed hose is depicted as having core tube 12 formed upon mandrel 30, which may be of flexible nylon material. The thermal barrier 14 is a strip 31 of fiberglass cloth of width sufficient when folded to encompass the periphery of core tube 12, with some overlap. The cloth strip 30 is supplied from a reel 32 of the material and is folded to encompass the periphery of the core tube 12 by a series of rollers 34, 36 only two of which are shown. The strip 31 of fiberglass is applied in this embodiment, longitudinally of the axis of the core tube 12 and preferably is applied continuously and simultaneously with the core tube 12 and succeeding wire reinforcement layer using well known hose-building techniques. While only a single strip of fiberglass cloth strip 31 is depicted in this embodiment it is clear that plural layers of cloth could be supplied to the core tube in a similar manner. Similarly variations could be made in the degree of encompassment of the cloth strip 31 over the periphery of the core tube 12 in each layer of same.

FIG. 4 is another variation in this form of manufacture of the hose 10 depicted in FIG. 1. Here the thermal barrier 14 is also formed of a strip 41 of fiberglass cloth supplied from a reel or the like (not shown). The fiberglass cloth 41 is applied helically over the core tube 12 to provide a complete envelopment of same and as previously described can be followed immediately by the braiding of the wire reinforcement layer 15 thereover. In this embodiment, the fiberglass cloth strip 41 is of a width and wound at an angle so that one-half of each preceding coil 42 is covered, resulting in a thermal barrier 14 structure which has two layers of cloth strip 41 therein. The degree of overlap, the number of layers of strip 41 and the thickness of the thermal barrier 14 can be varied to some extent to achieve desired properties and such is readily accommodated by the construction technique described.

What is claimed is:

1. A hydraulic hose for high temperature environments, comprising
   a rubber core tube,
   a thermal barrier disposed over said core tube in intimate contact therewith and with no intervening structure, said thermal barrier being formed of fibrous strip material applied generally longitudinally of said hose and fully enveloping said core tube,
   a single ply of wire reinforcement disposed over said thermal barrier in tensioned, intimate contact therewith, said wire reinforcement being an open weave on the order of 75 percent coverage and having interstices therein, and
   a cover of elastomeric material pressure extruded over said wire reinforcement and through said interstices therein into contact with said thermal barrier and bonded to said thermal barrier, the bond with said thermal barrier being achieved by vulcanization of said hose structure.

2. A hose as set forth in claim 1 wherein said strip material is nonwoven fiberglass.

* * * * *